May 15, 1956   M. A. JOHNSON   2,745,129
EDGE SMOOTHING AND SIZING TOOL
Filed Dec. 4, 1951
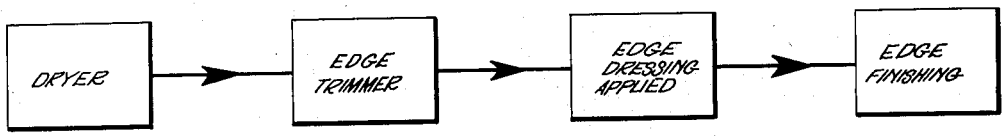
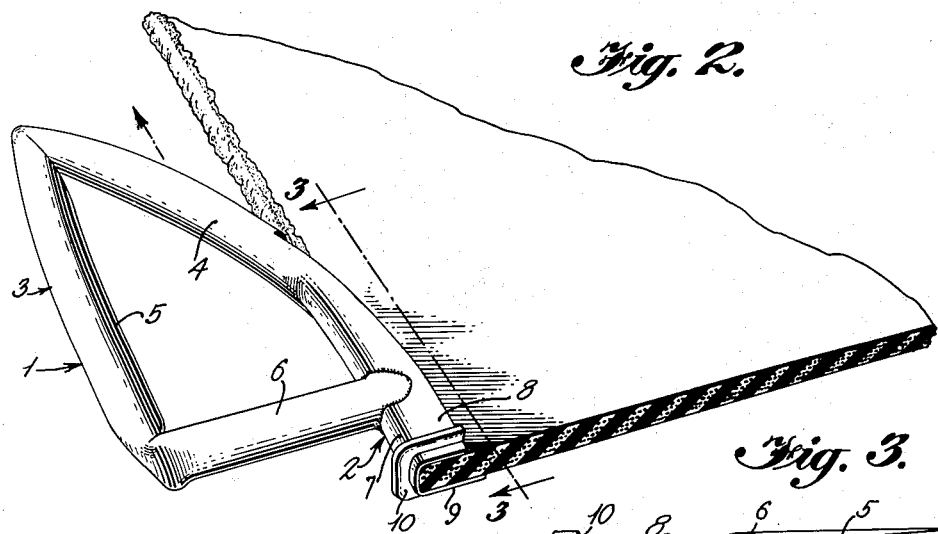
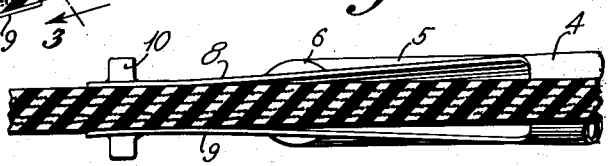
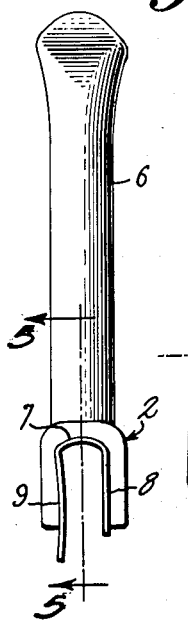
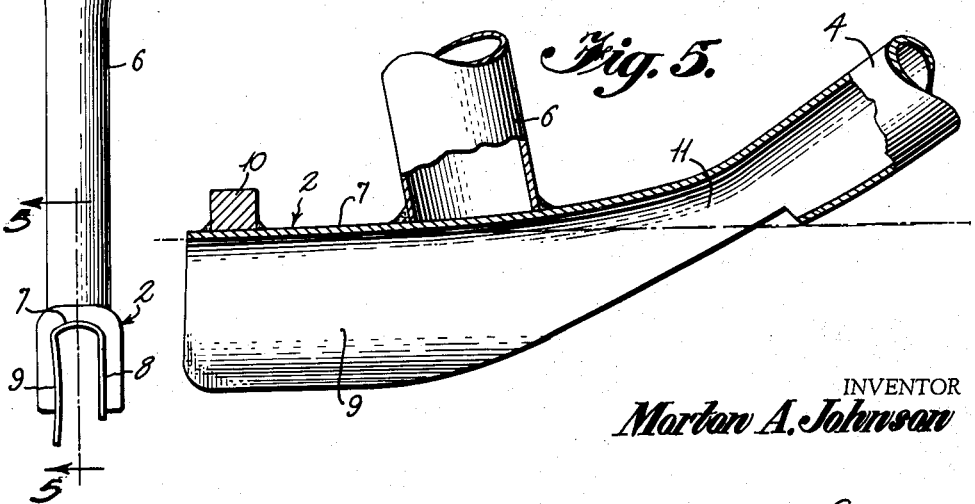
INVENTOR
Morton A. Johnson
BY Mason, Fenwick & Lawrence
ATTORNEYS

United States Patent Office 2,745,129
Patented May 15, 1956

2,745,129

EDGE SMOOTHING AND SIZING TOOL

Morton A. Johnson, Beckley, W. Va.

Application December 4, 1951, Serial No. 259,829

2 Claims. (Cl. 15—236)

This invention relates to a tool for finishing the edge of worn rubber-encased conveyor belts.

In the coal mining industry particularly, extremely long and quite wide conveyor belts are provided for transporting coal from the face of the mine to the entrance, and from the entrance to the tipple, or other desired point. These belts are laminated fabric structures completely encased in rubber. The belts run over guide rollers which are arranged to hold the belt in trough-shape, and at spaced intervals vertical side-guide rollers keep the belt in proper transverse alignment. Belts of this type are quite expensive and the cost of maintaining spare belts is prohibitive. The belts are subjected to extremely rough usage, and frequently become torn from sharp pieces of slate falling upon them, and from the jagged, heavy loads which they carry. Both edges of the belts have the rubber worn completely away, and the fabric becomes badly frayed.

In the past, little attention has been given to the worn side edges, the belt only being repaired when breaks or tears had been made in the body of the belt. As the belts are in use in the very damp atmosphere of the mine, the exposed fabric absorbs moisture and the entire fabric becomes saturated. This greatly accelerates deterioration. Even when the belts are repaired, the side edges are merely trimmed to cut away the frayed portions, and the belts put back in use with the fabric exposed at the sides.

The only means for recovering the side edges now known to the industry is to vulcanize new rubber over the edge portions. This is too expensive to make the operation economically feasible.

An object of the invention is to provide a tool by means of which the new coating may be uniformly distributed along the edge and feathered off to exactly coincide with the upper and lower faces of the belt.

Other objects of the invention will become apparent from the following description of a practical embodiment thereof, when taken in connection with the drawings which accompany and form a part of this specification.

In the drawings:

Figure 1 is a diagrammatic view showing the steps of the proposed method for using the invention;

Figure 2 is a perspective view of the new tool showing it in position upon a belt, and its manner of use in refinishing an edge thereof;

Figure 3 is a section through the belt taken on the line 3—3 and showing the working face of the tool;

Figure 4 is an end view of the tool; and,

Figure 5 is a medial section through the operative head of the tool and portions of the handle, and is taken on the line 5—5 of Figure 4.

Referring to the drawing in detail, and first adverting to Figure 1, there is diagrammatically shown the four steps which comprise the edge refinishing method for use of the present invention. These steps comprise passing the belt through a dryer, trimming the frayed edges, applying new coating material to the edges, and dressing it down to a uniform coating matching the original protective covering.

As previously mentioned, the belt comes from the mine with the laminated fabric structure wet from the dank atmosphere of the mine. Consequently, it is proposed to extract all of this moisture before the edges are sealed. This is done by placing the belt in an oven and maintaining it at a sufficiently high temperature to dry out all of the moisture without harming the belt. After the belt is thoroughly dried out, the edges are trimmed to remove the frayed portions and to provide straight, parallel edges.

When these preliminary steps are completed, a synthetic rubber compound, such as that sold under the trade-name "neoprene," is mixed with the usual accelerator to cause drying and the raw edge of the belt is coated with it. The edges of the belt are first coated with two applications of "neoprene" cement which will more readily adhere to rubber than does "neoprene" compound and to which "neoprene" compound will then more readily adhere. The material has somewhat the consistency of putty and is daubed upon the belt edge with a putty knife or similar tool. Care must be taken to insure a good coating completely covering the vertical raw edge and the top and bottom horizontal surfaces near the side edge.

After a short length of belt has had the material applied to it, approximately fifty to sixty feet, the material is then shaped by drawing through a suitable die to smooth up the coating and to make it of uniform thickness for the length of the belt.

The belt so repaired, when the edge material has cured, will be completely sealed against moisture, and will have all of its original flexibility.

A tool 1 for smoothing the coating to a finished edge is shown in Figures 2 to 5. The tool comprises a troweling die-head 2, and a substantially triangle handle 3. With the exception of the head, the tool is made of tubular material, crushed at points where the bends are desired. The handle has a section 4 angularly disposed with respect to the head and in continuation thereof, a section 5 joined to the section 4 and positioned substantially parallel to the head, and a section 6 joined to the section 5 and to the head and disposed perpendicularly to the head.

The head of the tool is in channel form, having a slightly arcuate back wall 7 and the side walls 8 and 9 which lie parallel to one another throughout the major portions of their depths. The open face of the channel is disposed away from the handle. The free end of the head, that is that end opposite the juncture with the handle portion 4, is sized to exactly fit the belt which is to be repaired. In other words, the parallel portions of the side walls are spaced apart the thickness of the belt. As belts of several thicknesses are in use, several sizes of tool will be necessary.

For a short distance from the free end, the sides of the channel are parallel when viewed from the face of the channel, as in Figure 3. From this point back to the juncture with the handle section 4, the channel sides diverge. The back wall 7 also follows a straight line rearward from the free end of the head to substantially the same point where the side walls begin to diverge, and from this point the back wall curves away from the plane of the straight section in the direction of the handle and merges with the angularly positioned handle section. The free end of the head will be the trailing edge of the head when the tool is drawn along the belt edge. Therefore, as the tool is drawn along the belt the rough coating previously applied to the edge will first contact the inclined side and top walls of the head. These inclined walls will act very much in the nature of a trowel to smooth out the coating and bring it down to the thickness necessary. When the belt passes through the straight and parallel portions of the channel, the coating will be accurately sized to feather into the top and bottom surfaces of the belt. To insure an overlapping of the new coating upon the old top and bottom surfaces of the belt, the side walls 8 and 9 may diverge slightly as they approach the back wall. This will admit a slightly heavier coating at the extreme edge but feather that coating off to the exact thickness of the original where it meets the original surface.

The free end of the head may be supplied with a stiffening member 10, if desired. The member 10 of heavy material will be welded or otherwise secured to the back and side walls of the channel to prevent any spreading of the channel walls when in use.

It will be noted that one of the side walls of the channel is longer than the other. The longer side is against the bottom of the belt when in use. The operator may smooth out any portion of the coating which is beyond the reach of the upper wall of the channel, but as it is difficult to see beneath the belt while working upon it the under side of the channel is made sufficiently wide to be sure that all coating material on the under side will be worked by the tool.

In operation, the tool is slipped over the edge of the belt as shown in Figure 2 and pulled along in the direction of the arrow. The edge of the belt will lie within the head of the tool approximately as shown by the broken line in Figure 5. That space at the rear of the head beyond the edge of the belt and adjacent the juncture with the handle, as indicated at 11, will serve as a reservoir to receive accumulation of coating material trowelled off of the belt. The material will ball up within this space and roll along on the edge surface of the belt furnishing additional material for any thin spots in the coating along the edge.

While in the above the one practical embodiment of the invention with respect to the tool has been disclosed, it will be understood that this is merely by way of example and changes may be made from the precise disclosure within the scope of the appended claims.

What is claimed is:

1. A tool for smoothing a coating upon an edge and two adjacent side surfaces of flexible strip material to form the coated strip to uniform thickness comprising, a head and a handle of tubular stock, said head being a continuation of one end of said handle and the other end of said handle secured to said head intermediate the ends of said head, said head being an elongated member which is U-shaped having a back wall and spaced side walls, the end of the head adjacent said one end of the handle being the leading end in use and the opposite end the trailing end, the side walls being parallel adjacent the trailing end and diverging toward the leading end and said back wall being flat adjacent the trailing end and flaring upwardly toward the leading end, the diverging side walls and upwardly flaring back wall forming between them a chamber for excess coating material.

2. A tool for smoothing a coating upon an edge and two adjacent side surfaces of flexible sheet material to form a coated material of uniform thickness comprising, a head portion and a handle portion, said head portion being in the form of a channel having a back wall and spaced side walls to embrace an edge portion of said strip material, with the side walls spaced apart a distance equal to the desired thickness of the strip material being worked upon, said side walls being parallel throughout a portion of their lengths and diverging with respect to one another for the remainder of their lengths, the parallel section being at that end of the head which forms the trailing end when the tool is in use, said back wall having a flat section in the region of the parallel sections of the side walls and curving outwardly from the plane of the flat section in the area of the divergent side walls, and a brace member secured to the back and side walls of the head near the trailing end thereof to hold the channel to predetermined shape.

References Cited in the file of this patent
UNITED STATES PATENTS

| Number | Name | Date |
|---|---|---|
| 735,309 | Spurlock | Aug. 4, 1903 |
| 972,225 | Pennell | Oct. 11, 1910 |
| 1,123,459 | Wright | Jan. 5, 1915 |
| 1,208,865 | Warwick | Dec. 19, 1916 |
| 1,769,525 | Maness | July 1, 1930 |
| 1,794,492 | Rendall | Mar. 3, 1931 |
| 1,826,240 | Chisholm | Oct. 6, 1931 |
| 2,008,952 | Gach | July 23, 1935 |
| 2,068,001 | Barnes | Jan. 19, 1937 |
| 2,151,183 | Bradley et al. | Mar. 21, 1939 |
| 2,271,285 | Bussert | Jan. 27, 1942 |
| 2,425,215 | West | Aug. 5, 1947 |
| 2,497,578 | Bradley | Feb. 14, 1950 |